US 8,502,412 B2

(12) United States Patent
Ang et al.

(10) Patent No.: US 8,502,412 B2
(45) Date of Patent: Aug. 6, 2013

(54) POWER SUPPLY SYSTEM FOR VEHICLE AND ELECTRICALLY-POWERED VEHICLE HAVING THE POWER SUPPLY SYSTEM

(75) Inventors: Wanleng Ang, Toyota (JP); Kenji Murasato, Toyota (JP); Kenji Itagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/389,149

(22) PCT Filed: Aug. 28, 2009

(86) PCT No.: PCT/JP2009/065028
§ 371 (c)(1),
(2), (4) Date: Feb. 6, 2012

(87) PCT Pub. No.: WO2011/024285
PCT Pub. Date: Mar. 3, 2011

(65) Prior Publication Data
US 2012/0133204 A1 May 31, 2012

(51) Int. Cl.
*B60L 1/00* (2006.01)
*B60L 3/00* (2006.01)
*H02G 3/00* (2006.01)

(52) U.S. Cl.
USPC ............................. 307/10.1; 307/9.1

(58) Field of Classification Search
USPC ....................................... 307/10.1
See application file for complete search history.

(56) References Cited

U.S. PATENT DOCUMENTS

| | | | |
|---|---|---|---|
| 6,860,357 B2 * | 3/2005 | Hayakawa | 180/277 |
| 7,889,524 B2 * | 2/2011 | Lee et al. | 363/65 |
| 8,035,247 B2 * | 10/2011 | Ichikawa | 307/10.1 |
| 2010/0019723 A1 | 1/2010 | Ichikawa | |

FOREIGN PATENT DOCUMENTS

| | | |
|---|---|---|
| JP | A-10-262305 | 9/1998 |
| JP | A-2008-206300 | 9/2008 |
| JP | A-2009-17675 | 1/2009 |
| JP | A-2009-131077 | 6/2009 |

OTHER PUBLICATIONS

International Search Report dated Nov. 17, 2009 in International Application No. PCT/JP2009/065028 (with translation).

* cited by examiner

*Primary Examiner* — Rexford Barnie
*Assistant Examiner* — Toan Vu
(74) *Attorney, Agent, or Firm* — Oliff & Berridge, PLC

(57) ABSTRACT

A charger converts electric power supplied from an AC power supply external to a vehicle into a predetermined charging voltage. A relay is provided between the charger and a power storage device. A charging ECU controls the charger and the relay. An AC/DC converter converts electric power supplied from the AC power supply into a predetermined power supply voltage and supplies the electric power converted into the power supply voltage to a charging device constituted of the charger, the relay and the charging ECU. While the power storage device is charged by the AC power supply, the charging device operates with the operating electric power it receives from the AC/DC converter.

10 Claims, 5 Drawing Sheets

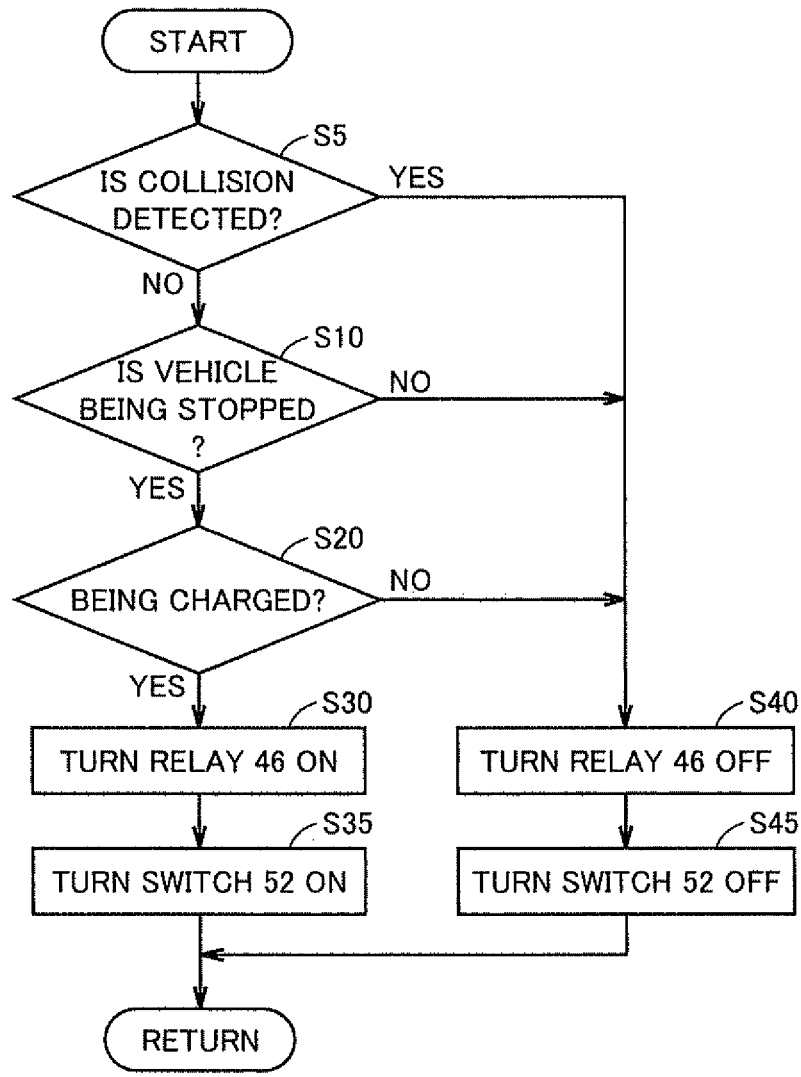

POWER SUPPLY SYSTEM FOR VEHICLE AND ELECTRICALLY-POWERED VEHICLE HAVING THE POWER SUPPLY SYSTEM

TECHNICAL FIELD

The present invention relates to a power supply system for a vehicle and an electrically-powered vehicle having the power supply system, and particularly to a power supply system for a vehicle configured to be chargeable by an external power supply which is external to the vehicle, as well as an electrically-powered vehicle having the power supply system.

BACKGROUND ART

The electric vehicle, the hybrid vehicle, the fuel cell vehicle, and the like are known as electrically powered vehicles configured to be capable of driving an electric motor for use in driving the vehicle, using electric power stored in a vehicle-mounted power storage device which is typically a secondary battery. For these electrically-powered vehicles, configurations have been proposed for charging a vehicle-mounted power storage device by a power supply that is external to the vehicle (hereinafter the power supply may simply be referred to as "external power supply" and charging of the vehicle-mounted power storage device by the external power supply may simply be referred to as "external charging").

For example, Japanese Patent Laying-Open No. 2009-17675 (PTL 1) discloses such an electrically-powered vehicle that can be charged by external charging. This electrically-powered vehicle is connected to an external power supply through a charge plug. A relay is interposed in an electrical path extending to a power storage device from a power feed node electrically connected to the external power supply through the charge plug. A control device operates with electric power from an auxiliary power supply that is provided separately from the above-mentioned power storage device, and controls open and close of the relay depending on the period for which the power storage device is charged. To the power feed node, none of electric-power-consuming components mounted on the electrically-powered vehicle is connected.

Thus, while the electrically-powered vehicle is connected to the external power supply, the standby power in the external power supply for a non-charging period can be made substantially zero (see PTL 1).

CITATION LIST

Patent Literature

PTL 1: Japanese Patent Laying-Open. No. 2009-17675

SUMMARY OF INVENTION

Technical Problem

If, however, the auxiliary power supply is active while external charging is performed, like the electrically-powered vehicle disclosed in the above-referenced patent literature, the auxiliary power supply may feed electric power to those components that are unnecessary for external charging, which could result in useless power consumption.

The present invention has accordingly been made to solve this problem, and an object of the invention is to prevent power consumption that is caused due to supply of electric power from the auxiliary power supply to those components unnecessary for external charging in a vehicle that is configured to be chargeable by an external power supply, and thereby improve the charging efficiency.

Solution to Problem

The power supply system for a vehicle according to the present invention is a power supply system for a vehicle configured to be chargeable by an external power supply, and the system includes a rechargeable power storage device, a charging device, and a converter. The charging device is configured to perform voltage conversion on electric power supplied from the external power supply and charge the power storage device. The converter is configured to convert electric power supplied from the external power supply into a predetermined power supply voltage and supply the electric power converted into the power supply voltage to the charging device.

Preferably, the charging device includes a charger, a first switch, and a control device. The charger converts the electric power supplied from the external power supply into a predetermined charging voltage. The first switch is provided between the charger and the power storage device. The control device controls the charger and the first switch. The converter supplies the electric power converted into the power supply voltage to the charger, the first switch, and the control device.

More preferably, the first switch is off while the vehicle runs or the power storage device is non-charged by the external power supply.

Preferably, the power supply system for a vehicle further includes an auxiliary power supply. The auxiliary power supply supplies electric power to an auxiliary system of the vehicle. The converter further supplies the electric power converted into the power supply voltage to the auxiliary power supply.

More preferably, the power supply system for a vehicle further includes an electrical drive system, a main switch, and a DC/DC converter. The electrical drive system is configured to drive the vehicle using electric power stored in the power storage device. The main switch is provided between the power storage device and the electrical drive system. The DC/DC converter is connected to an electric power line disposed between the main switch and the electrical drive system, and configured to convert electric power supplied from the electric power line into the power supply voltage and supply the power supply voltage to the auxiliary power supply. While the power storage device is charged by the external power supply, the main switch is off and the DC/DC converter is stopped.

Still more preferably, the power supply system for a vehicle further includes a collision detection unit and a second switch. The collision detection unit is configured to be capable of detecting a collision with the vehicle. The second switch is provided between the converter and the auxiliary power supply. When the collision detection unit detects a collision with the vehicle, the first switch and the second switch are turned off.

Further, according to the present invention, an electrically-powered vehicle includes any power supply system as described above, and an electric motor generating a drive torque using electric power stored in the power storage device of the power supply system.

Advantageous Effects of Invention

The present invention includes a converter that converts electric power supplied from an external power supply into a predetermined power supply voltage and supplies the resultant voltage to a charging device, and therefore requires no activation of the auxiliary power supply while external charging is performed. In accordance with the present invention, power consumption can thus be prevented that is caused due to supply of electric power from the auxiliary power supply to those components unnecessary for external charging, to thereby improve the charging efficiency.

BRIEF DESCRIPTION OF DRAWINGS

FIG. 6 is a flowchart for illustrating ON/OFF control of a relay that is performed by a charging ECU according to the third embodiment.

DESCRIPTION OF EMBODIMENTS

Figure 1:
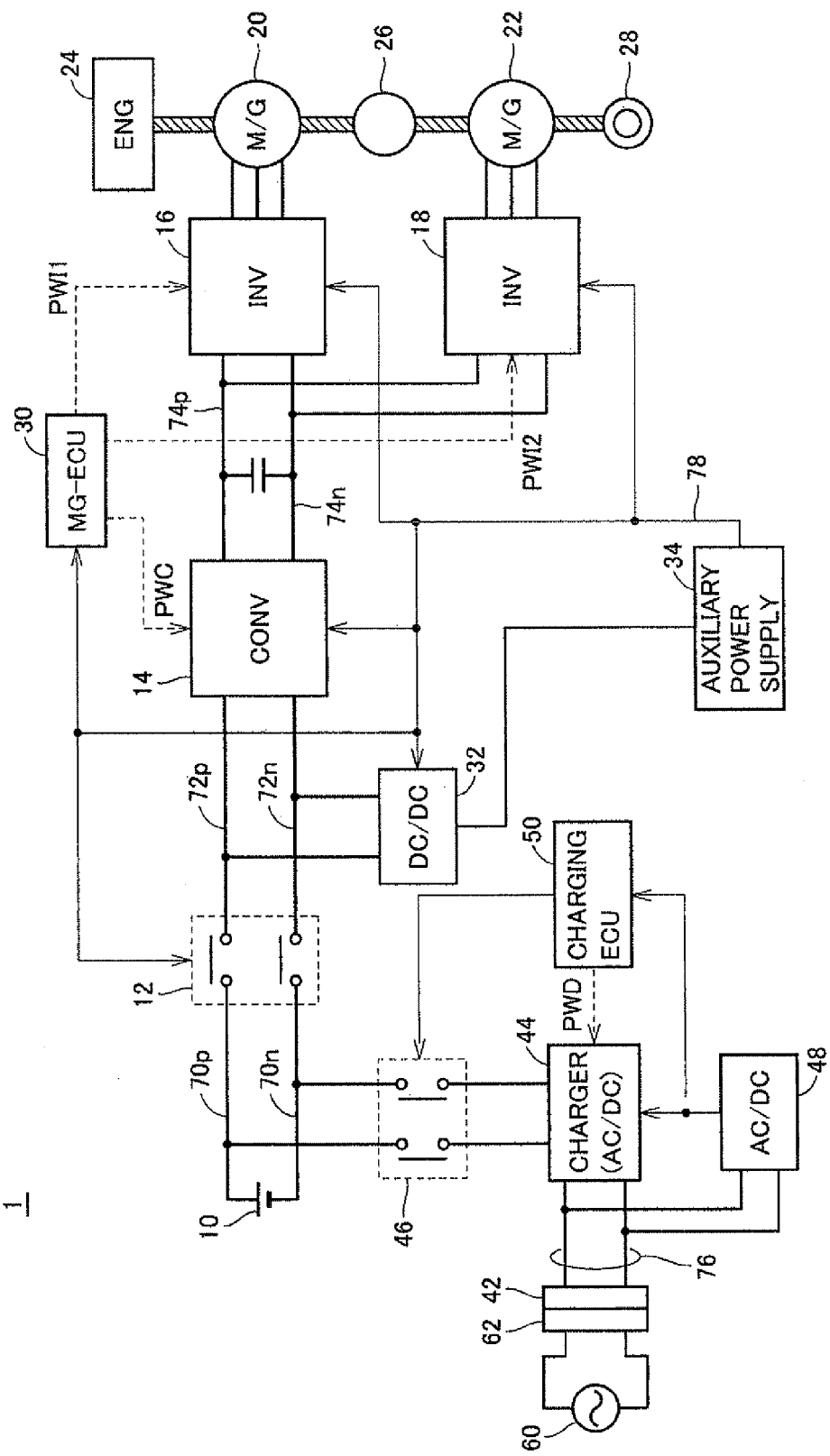
FIG. 1 is an overall block diagram of an electrically-powered vehicle according to a first embodiment of the present invention.

Embodiments of the present invention will hereinafter be described in detail with reference to the drawings. In the drawings, the same or corresponding components are denoted by the same reference characters, and a description thereof will not be repeated.

[First Embodiment]

FIG. 1 is an overall block diagram of an electrically-powered vehicle according to a first embodiment of the present invention. Referring to FIG. 1, this electrically-powered vehicle 1 includes a power storage device 10, a system main relay (hereinafter also referred to as "SMR (System Main Relay)") 12, a boost converter 14, inverters 16, 18, motor generators (hereinafter also referred to as "MG (Motor Generator)") 20, 22, an engine 24, a power split device 26, a drive wheel 28, and an MG-ECU (Electronic Control Unit) 30. Electrically-powered vehicle 1 further includes a DC/DC converter 32, an auxiliary power supply 34, a charging inlet 42, a charger 44, a relay 46, an AC/DC converter 48, and a charging ECU 50.

SMR 12 is provided between power storage device 10 and boost converter 14. Inverters 16, 18 are connected through a main positive bus 74p and a main negative bus 74n to boost converter 14. DC/DC converter 32 is connected to a positive line 72p and a negative line 72n that are disposed between SMR 12 and boost converter 14. Auxiliary power supply 34 is connected to DC/DC converter 32.

Further, charger 44 is connected through relay 46 to a positive line 70p and a negative line 70n. To the input side of charger 44, charging inlet 42 is connected through a pair of electric power lines 76. AC/DC converter 48 is connected to the pair of electric power lines 76 located between charging inlet 42 and charger 44.

Power storage device 10 is a rechargeable DC power supply and formed of a secondary battery such as nickel-metal hydride or lithium ion battery, for example. While SMR 12 is ON, power storage device 10 supplies electric power to boost converter 14 and DC/DC converter 32. Power storage device 10 also receives and is charged with electric power generated by MG 20 and/or MG 22 and supplied from boost converter 14. Further, while electrically-powered vehicle 1 is charged by an AC power supply (commercial power supply for example) 60 that is external to the vehicle (charged by external charging), power storage device 10 is charged by charger 44. A capacitor of a large capacity may also be employed as power storage device 10. Power storage device 10 may be any as long as it is an electric power buffer capable of temporarily storing electric power generated by MG 20, 22 and electric power supplied from AC power supply 60 and supplying the stored electric power to boost converter 14 and DC/DC converter 32.

SMR 12 is formed of an electromagnetic relay that is made electrically conductive (turned on) when being supplied with excitation current by an excitation circuit (not shown), and is opened (turned off) when being supplied with no excitation current. Based on a control signal PWC provided from MG-ECU 30, boost converter 14 boosts the voltage between main positive bus 74p and main negative bus 74n to a voltage that is equal to or higher than the voltage between positive line 72p and negative line 72n (voltage of power storage device 10). This boost converter 14 is formed for example of a current-reversible-type DC chopper circuit including reactor for storing energy.

Inverter 16 drives MG 20 based on a control signal PWI1 provided from MG-ECU 30. Inverter 18 drives MG 22 based on a control signal PWI2 provided from MG-ECU 30. Inverters 16, 18 are each formed for example of a three-phase bridge circuit including a U phase arm, a V phase arm, and a W phase arm.

MG 20, 22 are each an AC rotating electric machine and formed of a three-phase AC synchronous electric motor having permanent magnets embedded in a rotor, for example. MG 20 has a rotational shaft connected to power split device 26, and MG 22 has a rotational shaft coupled to drive wheel 28. Power split device 26 is formed of a planetary gear train constituted of a sun gear, a pinion gear, a planetary carrier, and a ring gear. To power split device 26, the rotational shaft of MG 20, a crankshaft of engine 24, and a drive shaft coupled to drive wheel 28 are connected, and power split device 26 distributes the output of engine 24 to MG 20 and drive wheel 28.

MG-ECU 30 generates control signal PWC for driving boost converter 14 and control signals PWI1, PWI2 for driving MG 20, 22 respectively, and outputs the generated control signal PWC to boost converter 14 and control signals PWI1, PWI2 to inverters 16, 18 respectively.

DC/DC converter 32 steps down the output voltage to a predetermined power supply voltage (auxiliary voltage) that is lower than the voltage between positive line 72p and negative line 72n (voltage of power storage device 10), and outputs the resultant voltage to auxiliary power supply 34. Auxiliary power supply 34 includes an auxiliary battery formed for example of a lead-acid battery, and stores electric power supplied from DC/DC converter 32 in the auxiliary battery. While the vehicle runs, auxiliary power supply 34 supplies operating electric power to SMR 12, boost converter 14, inverters 16, 18, MG-ECU 30 and DC/DC converter 32.

Charging inlet 42 is configured to be connectable to a connector 62 that is connected to AC power supply 60 that is external to the vehicle, and receives AC power supplied from AC power supply 60. Charger 44 converts, based on a control signal PWD provided from charging ECU 50, the AC power supplied from AC power supply 60 into a predetermined charging voltage (DC). Then, the electric power generated by the voltage conversion by charger 44 is supplied through relay 46 to power storage device 10 to charge power storage device 10. Charger 44 is formed for example of an AC/DC converter.

Relay 46 is formed of an electromagnetic relay that is driven by charging ECU 50, rendered electrically conductive (turned on) when being supplied with excitation current from charging ECU 50, and opened (turned off) when being supplied with no excitation current. Relay 46 is ON while external charging is performed, and OFF while the vehicle is running or external charging is not performed.

While the vehicle runs, hundreds of amperes of charging and discharging current flows. In contrast, while external charging is performed, approximately a few amperes of charging current flows. While it is therefore necessary to select SMR 12 with a large capacity of large power consumption, relay 46 of a smaller capacity of smaller power consumption, relative to SMR 12, may be selected.

AC/DC converter 48 converts AC power supplied from AC power supply 60 into a predetermined power supply voltage (DC). AC/DC converter 48 then supplies the electric power converted into the power supply voltage to charging ECU 50, charger 44, and relay 46. The electric power is supplied from AC/DC converter 48 to charging ECU 50 to be used as the operating power of the charging ECU, to charger 44 to be used as the operating power of a control circuit board and a sensor for example, and to relay 46 to be used for excitation current of the electromagnetic relay. The electric power is supplied from AC/DC converter 48 to relay 46 through charging ECU 50 as will be described later herein.

While external charging is performed, charging ECU 50 receives and operates with the electric power supplied from AC/DC converter 48. Further, while external charging is performed, charging ECU 50 generates excitation current for driving relay 46 and outputs the excitation current to relay 46. While external charging is performed, charging ECU 50 also generates control signal PWD for driving charger 44 and outputs the generated control signal PWD to charger 44.

In this first embodiment, while external charging is performed, charging ECU 50 is being made active and charger 44 and relay 46 are driven by charging ECU 50.

Here, the operating power of charging ECU 50, charger 44, and relay 46 is not supplied from auxiliary power supply 34 but supplied from AC/DC converter 48 which converts the AC power supplied from AC power supply 60 into the power supply voltage. Thus, in the first embodiment, auxiliary power supply 34 is not active while external charging is performed.

Figure 2:
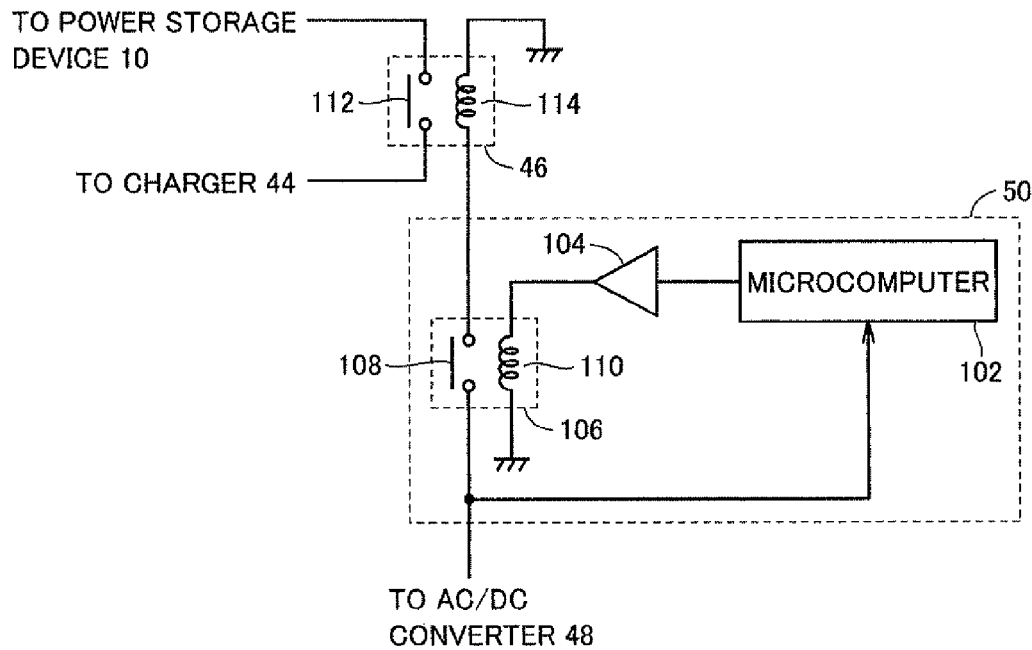
FIG. 2 is a diagram showing a power supply circuit for a charging ECU and a relay shown in FIG. 1.

FIG. 2 is a diagram showing a power supply circuit for charging ECU 50 and relay 46 shown in FIG. 1. Referring to FIG. 2, charging ECU 50 includes a microcomputer 102, an amplifier 104, and a relay 106.

While external charging is performed, microcomputer 102 receives and operates with the electric power supplied from AC/DC converter 48. When a predetermined condition for performing external charging is satisfied, microcomputer 102 outputs a signal to amplifier 104. Amplifier 104 receives the signal from microcomputer 102 to amplify the received signal and supplies excitation current to relay 106.

Relay 106 includes a contact portion 108 and a coil 110. When the excitation current is supplied from amplifier 104 to coil 110, contact portion 108 is rendered electrically conductive and the excitation current is supplied from AC/DC converter 48 through contact portion 108 to relay 46.

Relay 46 includes a contact portion 112 and a coil 114. When relay 106 of charging ECU 50 is turned on and accordingly the excitation current is supplied from AC/DC converter 48 to coil 114, contact portion 112 is rendered electrically conductive. Accordingly, relay 46 is turned on and charger 44 is electrically connected to power storage device 10.

The operating power of charging ECU 50 and relay 46 is thus supplied from AC/DC converter 48.

Figure 3:
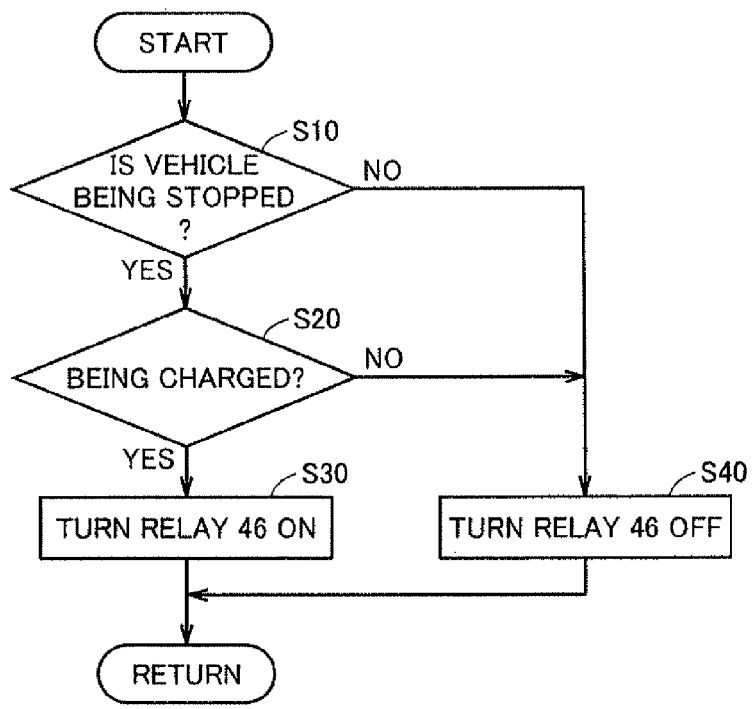
FIG. 3 is a flowchart for illustrating ON/OFF control of the relay that is performed by the charging ECU.

FIG. 3 is a flowchart for illustrating ON/OFF control of relay 46 that is performed by charging ECU 50. The process of this flowchart is executed at certain time intervals or each time a predetermined condition is satisfied, while charging ECU 50 is being made active by the operating power it receives from AC/DC converter 48.

Referring to FIG. 3, charging ECU 50 determines whether or not electrically-powered vehicle 1 is being stopped (step S10). Whether or not electrically-powered vehicle 1 is being stopped may be determined based on whether or not drive wheel 28 is actually rotating, or based on whether or not the shift lever (not shown) is set in the parking position. Alternatively, it may be determined based on whether or not the start switch or ignition switch for example is made ON.

Subsequently, charging ECU 50 determines whether or not external charging is being performed (step S20). Regarding the determination as to whether or not external charging is being performed, it is determined that external charging is being performed, based on the condition that charging inlet 42 and connector 62 (FIG. 1) are connected to each other and the remaining capacity (SOC) of power storage device 10 has become small.

When it is determined in step S20 that external charging is being performed (YES in step S20), charging ECU 50 uses the operating power supplied from AC/DC converter 48 and supplies the excitation current to relay 46 as described above. Accordingly, relay 46 is turned on (step 530). In contrast, when it is determined in step 520 that external charging is not being performed (NO in step S20), charging ECU 50 does not supply the excitation current to relay 46. Relay 46 is accordingly turned off (step S40).

Thus, in the first embodiment, AC/DC converter 48 is provided that converts the electric power supplied from AC power supply 60 that is external to the vehicle into a predetermined power supply voltage and supplies the power supply voltage to a charging device made up of charger 44, relay 46, and charging ECU 50, and it is therefore unnecessary to keep auxiliary power supply 34 active while external charging is performed. In this way, the first embodiment can prevent power consumption that is caused due to supply of electric power from auxiliary power supply 34 to those components unnecessary for external charging, and thus improve the charging efficiency.

Further, in the first embodiment, relay 46 used dedicatedly for connecting charger 44 to power storage device 10 is provided, and charger 44 is directly connected by relay 46 to power storage device 10 without SMR 12 interposed. Here, since the charging current is smaller than the current while the vehicle is running, relay 46 having a smaller capacity of smaller power consumption may be used, relative to SMR 12. Therefore, the first embodiment can reduce power consumption while external charging is performed, and consequently the efficiency of external charging is improved.

[Second Embodiment]

In this second embodiment, while external charging is performed, electric power is also supplied to the auxiliary power supply by the AC/DC converter which converts AC power supplied from AC power supply 60 into a predetermined power supply voltage (DC). Thus, the auxiliary battery included in the auxiliary power supply is also charged by the external power supply.

Figure 4:
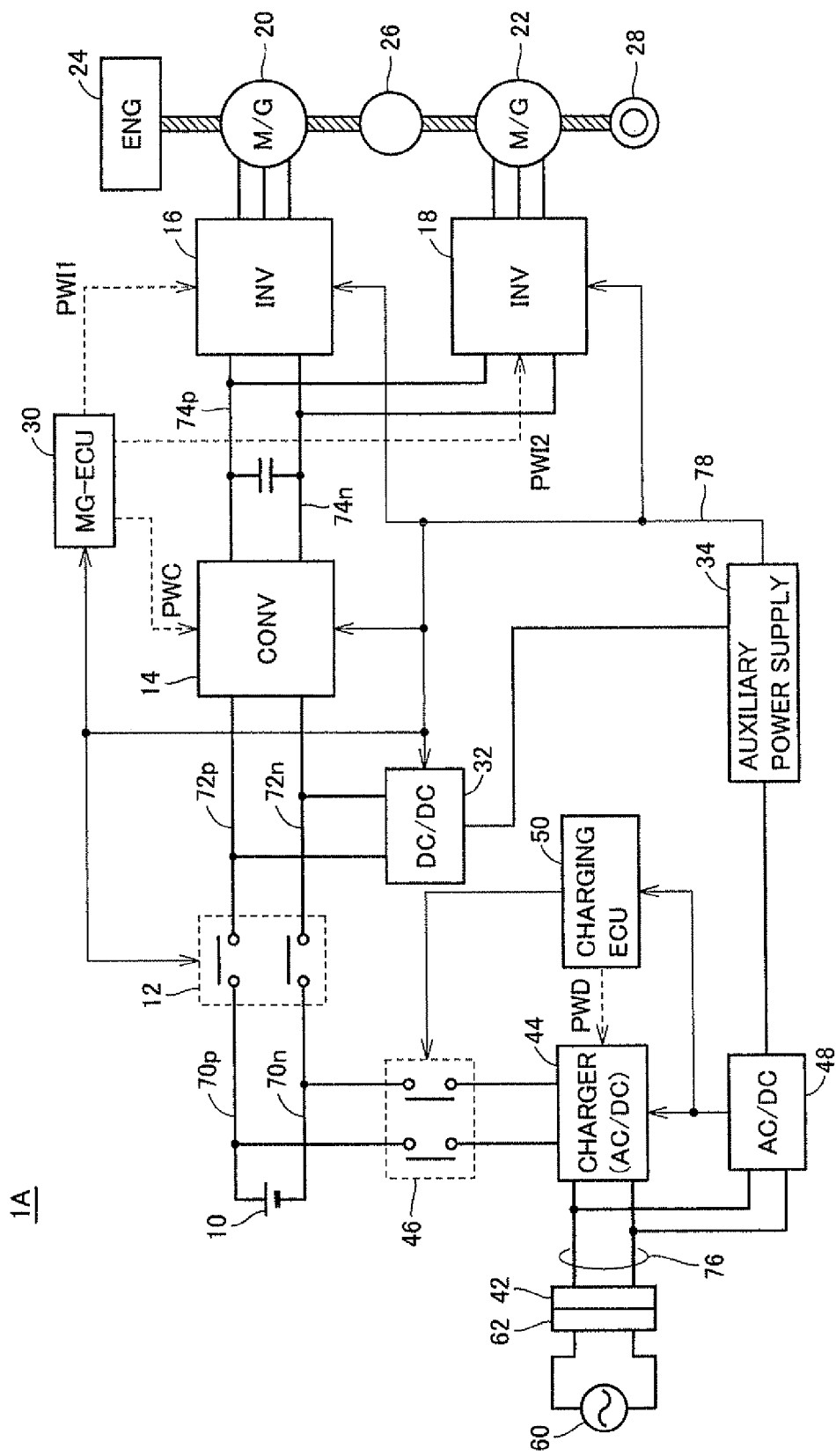
FIG. 4 is an overall block diagram of an electrically-powered vehicle according to a second embodiment.

FIG. 4 is an overall block diagram of an electrically-powered vehicle according to the second embodiment. Referring to FIG. 4, this electrically-powered vehicle 1A corresponds to the configuration of electrically-powered vehicle 1 of the first embodiment shown in FIG. 1 in which an electric power line is disposed between AC/DC converter 48 and auxiliary power supply 34.

While external charging is performed, AC/DC converter 48 supplies the operating electric power to a charging device made up of charger 44, relay 46, and charging ECU 50, and also supplies the electric power to auxiliary power supply 34. Thus, while external charging is performed, the auxiliary battery included in auxiliary power supply 34 is also charged, together with power storage device 10, by AC power supply 60.

Except for the above-described feature, the configuration of electrically-powered vehicle 1A is similar to that of electrically-powered vehicle 1 of the first embodiment shown in FIG. 1.

In accordance with the second embodiment, auxiliary power supply 34 is charged by AC/DC converter 48 while external charging is performed. Therefore, it is unnecessary to turn on SMR 12 and drive DC/DC converter 32 for charging auxiliary power supply 34 while external charging is performed. Therefore, in the second embodiment, the efficiency of external charging can also be improved even in the case where auxiliary power supply 34 is charged together with power storage device 10 while external charging is performed.

[Third Embodiment]

In this third embodiment, a G sensor (acceleration sensor) capable of detecting a collision with the vehicle's body is provided. In response to detection of a collision with the vehicle's body while external charging is performed, charger 44 and power storage device 10 are electrically disconnected from each other and AC/DC converter 48 is also electrically disconnected from auxiliary power supply 34.

Figure 5:
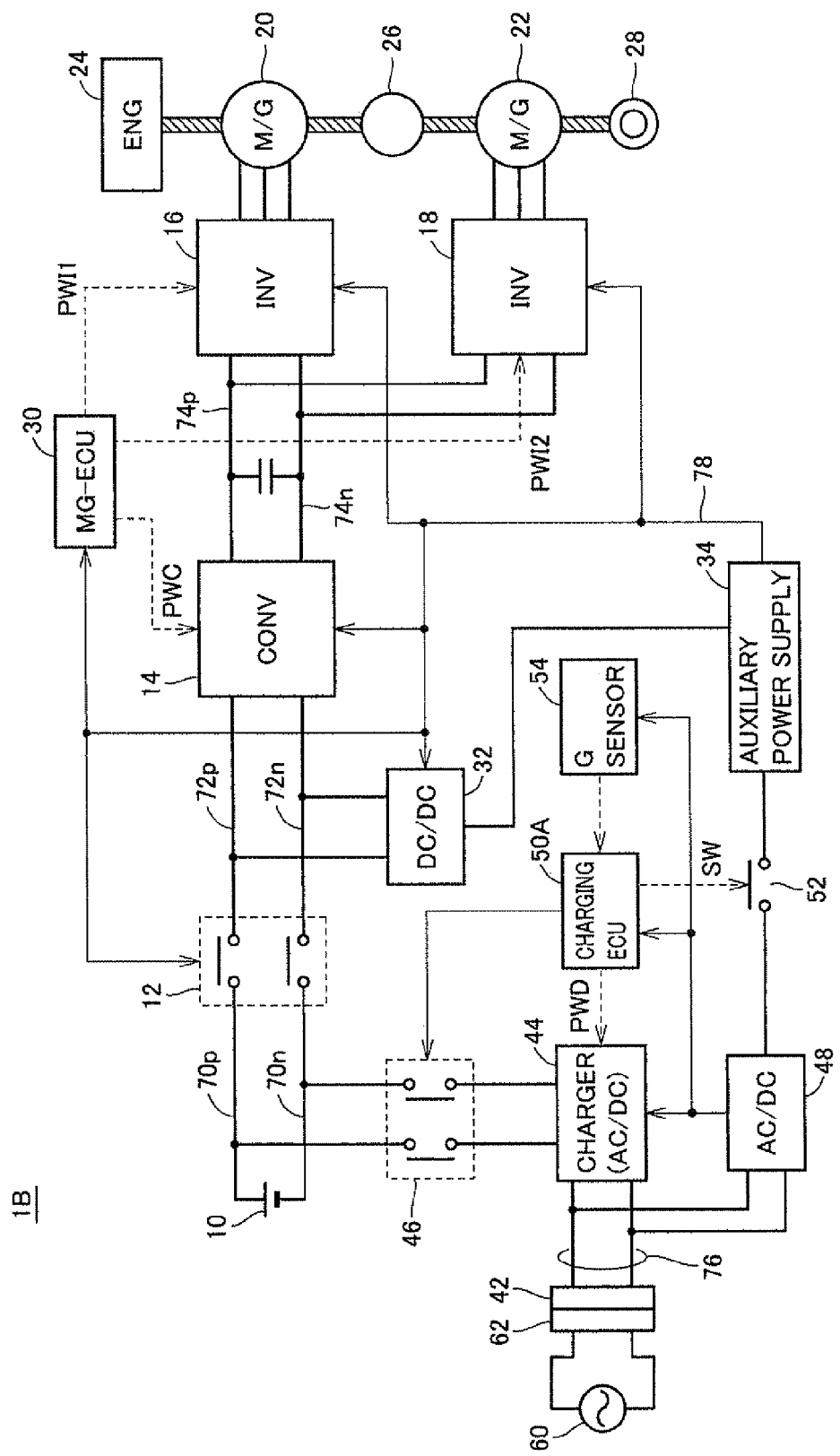
FIG. 5 is an overall block diagram of an electrically-powered vehicle according to a third embodiment.

FIG. 5 is an overall block diagram of an electrically-powered vehicle in the third embodiment. Referring to FIG. 5, this electrically-powered vehicle 1B corresponds to the configuration of electrically-powered vehicle 1A in the second embodiment shown in FIG. 4 in which a switch 52 and a G sensor 54 are further included and a charging ECU 50A is included instead of charging ECU 50.

Switch 52 is provided on the electric power line disposed between AC/DC converter 48 and auxiliary power supply 34. Switch 52 is turned on/off in response to a signal SW provided from charging ECU 50A.

While external charging is performed, G sensor 54 receives and operates with the electric power supplied from AC/DC converter 48. While external charging is performed, G sensor 54 detects acceleration applied to the vehicle's body and outputs the detected value of the acceleration to charging ECU 50A.

While external charging is performed, charging ECU 50A detects a collision with the vehicle, based on the detected value of the acceleration provided from G sensor 54. When a collision is detected, charging ECU 50A turns off relay 46 and also turns off switch 52. The configuration of charging ECU 50A except for the above-described feature is similar to that of ECU 50 in the first and second embodiments described above.

FIG. 6 is a flowchart for illustrating ON/OFF control of relay 46 that is performed by charging ECU 50A in the third embodiment. The process of this flowchart is also executed at certain time intervals or each time a predetermined condition is satisfied, while charging ECU 50A is being made active by the operating power it receives from AC/DC converter 48.

Referring to FIG. 6, this flowchart further includes steps S5, S35, and S45 in addition to the steps of the flowchart shown in FIG. 3. Namely, when an instruction is given to start the series of process steps shown in this flowchart, charging ECU 50A determines, based on the detected value of G sensor 54 (FIG. 5), whether or not a collision with the vehicle is detected (step S5).

When a collision is not detected (NO in step S5), charging ECU 50A proceeds to step S10 and determines whether or not electrically-powered vehicle 1 is being stopped. In contrast, when a collision is detected (YES in step S5), charging ECU 50A proceeds to step S40 and turns relay 46 off.

When relay 46 is turned on in step 530, switch 52 (FIG. 5) is also turned on based on signal SW from charging ECU 50A (step S35). When relay 46 is turned off in step S40, switch 52 is also turned off based on signal SW from charging ECU 50A (step S45).

Thus, in the third embodiment, in response to detection of a collision with the vehicle while external charging is being performed, relay 46 and switch 52 are turned off and power storage device 10 and auxiliary power supply 34 are electrically disconnected from charger 44 and AC power supply 60. In this way, the third embodiment improves the collision safety of the vehicle.

While the above-described embodiments each provide AC/DC converter 48 since the external power supply is AC power supply 60, a DC/DC converter may be provided instead of AC/DC converter 48 in the case where the external power supply is a DC power supply, to thereby implement functions similar to those of the above-described embodiments each.

Further, while the description above is given, as an example of the electrically-powered vehicles, of a series/parallel-type hybrid vehicle in which power split device 26 can split motive power of engine 24 and transmit the power to drive wheel 28 and MG 20, the present invention is also applicable to hybrid vehicles of other types. For example, the present invention is also applicable to vehicles such as a so-called series-type hybrid vehicle in which engine 24 is used solely for driving MG 20 and only MG 22 is used to generate the power for driving the vehicle, a hybrid vehicle in which only the regenerative energy of the kinetic energy generated by the engine is collected as electrical energy, and a hybrid vehicle of motor-assisted type in which the engine is used as a main power source which is assisted by a motor as required.

Further, the present invention is also applicable to vehicles such as an electric vehicle without engine 24 that runs with electric power only, and a fuel cell vehicle that further includes a fuel cell as a DC power supply, in addition to power storage device 10. The present invention is applicable as well to electrically-powered vehicles having no boost converter 14.

In the foregoing description, AC power supply 60 corresponds to an embodiment of "external power supply" of the present invention, and charger 44, relay 46, and charging ECU 50 constitute an embodiment of "charging device" of the present invention. Further, AC/DC converter 48 corresponds to an embodiment of "converter" of the present invention, and relay 46 corresponds to an embodiment of "first switch" of the present invention. Furthermore, charging ECU 50 corresponds to an embodiment of "control device" of the present invention, and boost converter 14, inverters 16, 18, and MG 20, 22 constitute an embodiment of "electrical drive system" of the present invention.

Moreover, SMR 12 corresponds to an embodiment of "main switch" of the present invention, and G sensor 54 and charging ECU 50A constitute an embodiment of "collision detection unit" of the present invention. Further, switch 52 corresponds to an embodiment of "second switch" of the present invention, and MG 22 corresponds to an embodiment of "electric motor" of the present invention.

It should be construed that the embodiments disclosed herein are by way of illustration in all respects, not by way of limitation. It is intended that the scope of the present invention is defined by claims, not by the above description of the embodiments, and encompasses all modifications and variations equivalent in meaning and scope to the claims.

REFERENCE SIGNS LIST 1, 1A, 1B electrically-powered vehicle; 10 power storage device; 12 SMR; 14 boost converter; 16, 18 inverter; 20, 22 MG; 24 engine; 26 power split device; 28 drive wheel; 30 MG-ECU; 32 DC/DC converter; 34 auxiliary power supply; 42 charging inlet; 44 charger: 46, 106 relay; 48 AC/DC converter; 50, 50A ECU; 52 switch; 54 G sensor; 60 AC power supply; 62 connector; 70$p$, 72$p$ positive line; 70$n$, 72$n$ negative line; 74$p$ main positive bus; 74$n$ main negative bus; 76 pair of electric power lines; 102 microcomputer; 104 amplifier; 108, 112 contact portion; 110, 114 coil

The invention claimed is:

1. A power supply system for a vehicle configured to be chargeable by an AC power supply external to the vehicle, said power supply system comprising:
   a rechargeable power storage device;
   a charging inlet receiving AC electric power supplied from said AC power supply;
   a charging device configured to perform voltage conversion on said AC electric power that is input from said charging inlet and charge said power storage device; and
   an AC/DC converter connected between said charging inlet and said charging device, and configured to convert said AC electric power that is input from said charging inlet into a predetermined DC power supply voltage and supply electric power converted into the DC power supply voltage to said charging device,
   wherein the AC/DC converter is separate from the charging device.

2. The power supply system for a vehicle according to claim 1, wherein
   said charging device includes:
   a charger converting said AC electric power into a predetermined charging voltage;
   a first switch provided between said charger and said power storage device; and
   a control device for controlling said charger and said first switch, and
   said AC/DC converter supplies the electric power converted into said power supply voltage to said charger, said first switch, and said control device.

3. The power supply system for a vehicle according to claim 2, wherein said first switch is off while said vehicle runs or said power storage device is non-charged by said AC power supply.

4. The power supply system for a vehicle according to claim 1, further comprising an auxiliary power supply supplying electric power to an auxiliary system of said vehicle, wherein
   said AC/DC converter further supplies the electric power converted into said power supply voltage to said auxiliary power supply.

5. The power supply system for a vehicle according to claim 4, further comprising:
   an electrical drive system configured to drive said vehicle using electric power stored in said power storage device;
   a main switch provided between said power storage device and said electrical drive system; and
   a DC/DC converter connected to an electric power line disposed between said main switch and said electrical drive system, and configured to convert electric power supplied from said electric power line into said power supply voltage and supply said power supply voltage to said auxiliary power supply, wherein
   while said power storage device is charged by said AC power supply, said main switch is off and said DC/DC converter is stopped.

6. The power supply system for a vehicle according to claim 4, further comprising:
   a collision detection unit configured to be capable of detecting a collision with said vehicle; and
   a second switch provided between said AC/DC converter and said auxiliary power supply, wherein
   when said collision detection unit detects a collision with said vehicle, said first switch and said second switch are turned off.

7. An electrically-powered vehicle comprising:
   the power supply system as recited in claim 1; and
   an electric motor generating a drive torque using electric power stored in the power storage device of said power supply system.

8. The power supply system for a vehicle according to claim 2, further comprising an auxiliary power supply supplying electric power to an auxiliary system of said vehicle, wherein
   said AC/DC converter further supplies the electric power converted into said power supply voltage to said auxiliary power supply.

9. The power supply system for a vehicle according to claim 3, further comprising an auxiliary power supply supplying electric power to an auxiliary system of said vehicle, wherein
   said AC/DC converter further supplies the electric power converted into said power supply voltage to said auxiliary power supply.

10. The power supply system for a vehicle according to claim 1, wherein the AC/DC converter is connected between the charging inlet and the charging device by at least one first path, and the at least one first path is separate from a second path connected to an auxiliary power supply.

* * * * *